3,057,905
METHOD FOR PREPARING TETRAALKOXYDI-
BORON AND TETRAARYLOXYDIBORON COM-
POUNDS
Robert J. Brotherton, Fullerton, and William G. Woods, Anaheim, Calif., assignors to United States Borax & Chemical Corporation, Los Angeles, Calif., a corporation of Nevada
No Drawing. Filed Aug. 22, 1960, Ser. No. 50,861
4 Claims. (Cl. 260—462)

The present invention relates to an improved method for the preparation of organic compounds having boron-boron bonds.

The syntheses of organic compounds having boron-boron bonds have in the past been tedious, time consuming and expensive and have resulted in yields of questionable end products.

It is therefore the principal object of the present invention to provide an improved method for preparing organic compounds having boron-boron bonds.

Other objects of the invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the ways in which the principle of the invention may be employed.

Broadly stated, the present invention comprises the method for producing substantially pure tetraalkoxydiboron and tetraaryloxydiboron compounds which comprises reacting a compound having the general formula $(RO)_2BX$ with an alkali metal having a continuously available clean active surface in an inert atmosphere, with constant agitation according to the general reaction $$2(RO)_2BX + 2M \xrightarrow{R'_3N} B_2(OR)_4 + 2MX$$

where $R'_3N$ is an amine selected from the group consisting of pyridine and tertiary alkyl amines having primary and secondary alkyl groups, M is a metal having a continuously available clean active surface selected from the group consisting of the alkali metals and sodium and potassium alloys, and $(RO)_2BX$ is a compound selected from the group consisting of dialkoxymonohaloboranes and diaryloxymonohaloboranes wherein R is a radical selected from the group consisting of alkyls having from 1 to 20 carbon atoms, phenyl, naphthyl and alkyl substituted phenyl said alkyl substituents having from 1 to 12 carbon atoms and X is halogen.

As can be seen in the foregoing broadly stated paragraph, the tertiary amine does not enter into the reaction and consequently the amount of tertiary amine used is immaterial to the present invention. The amine may be used in from a catalytic amount to an amount where the amine would act as a solvent for the reaction. It is of the utmost importance that the tertiary amine be present in the reaction mixture, in order for the reaction to go to completion and to obtain substantially pure diboron compounds.

The following list is illustrative of the tertiary amines applicable to the present invention:

Triethylamine
Triisopropylamine
Pyridine
Tri-n-octylamine
Triisoamylamine
Trimethylamine
Tri-n-hexylamine
Triisobutylamine
Tri-n-propylamine
Tri-n-amylamine In the preferred embodiment of our invention we use pyridine or tertiary amines derived from primary and secondary alkyls containing from 1 to 6 carbon atoms as they are the most economical and most readily available of the tertiary amines applicable to the present invention.

The following list to illustrative of dialkoxymonohaloboranes and diaryloxymonohaloboranes applicable to the present invention:

Chlorodiethoxyborane
Bromodiisopropoxyborane
Bromodi-n-butoxyborane
Bromodiisobutoxyborane
Bromodi-sec-butoxyborane
Chlorodiphenoxyborane
Bromodi-(2-methylphenoxy)borane
Chlorodimethoxyborane
Chlorodi-(4-propylphenoxy)borane
Bromodi-(2,4-diethylphenoxy)borane
Chlorodi-(1-napthoxy)borane
Bromodi-n-octyloxyborane
Bromodi-(t-amyloxy)borane
Chlorodi-(4-isobutylphenoxy)borane
Chlorodistearoxyborane
Chlorodieicosoxyborane It is to be clearly understood that the foregoing is only a representative list of the more common dialkoxy- and diaryloxy-monohaloboranes which are applicable to the present invention. As for the halogen, the iodo and fluoro compounds are also applicable to the present invention.

It will be noted that in the broadly stated paragraph the reducing metal is specifically described as having a continuously available clean active surface. This is necessary in order for the reaction to go to completion and to obtain maximum yields. To have a continuously available clean active surface, the metal must be either dispersed in a very small particle size or in a liquid or molten condition. This, in effect it is necessary to have the metal in such a physical state where it provides a maximum surface area and which presents a continuously available clean active surface for reaction with the dialkoxy- and diaryloxy-monohaloboranes.

The products of the present process, namely, the tetraalkoxydiborons and tetraaryloxydiborons, can be disproportionated to produce polymeric boranes wherein the recurring unit is $(BOR)_x$. hese boron-boron bonded compounds will also be found to have use as herbicides and as intermediates in chemical syntheses.

So that the present invention will be more clearly understood, the following examples are given:

I

A solution of 31.86 grams (0.234 mole) of chlorodiethoxyborane in 75 ml. of mineral oil was added at room temperature and in an inert atmosphere to 5.91 grams (0.257 mole) of sodium dispersed in 280 ml. of mineral oil. Triethylamine, 5 ml. (0.036 mole), was added and the mixture was stirred for about 3 hours at 30° to 40° C. Distillation at reduced pressure gave a mixture of ethylborate and tetraethoxydiboron. The mixture was then fractionated by slow passage through a trap at about 0° C. to give the tetraethoxydiboron. Chemical analysis of the product yielded the following data:

Calculated for $C_8H_{20}O_4B_2$: Percent B=10.72%; mol. wt.=202. Found in product: Percent B=10.61%; mol. wt.=203.

II

Example I was repeated using 100 ml. of (0.36 mole) triethylamine instead of 5 ml. (0.036 mole) of triethylamine. The reaction rate remains approximately the same as in Example I and the product recovered was the same as in Example I.

III

A solution of 83.6 grams (0.40 mole) of bromodiisopropoxyborane in 125 ml. of dodecane was added at room temperature and in an inert atmosphere to 9.66 grams (0.42 mole) of sodium dispersed in 500 ml. of dodecane. Pyridine, 4 ml. (0.07 mole), was added and the mixture was stirred for three hours at from 30° to 40° C. Distillation at reduced pressure gave isopropyl borate as a distillate and tetraisopropoxydiboron as a residual product. Chemical analysis of the product yielded the following data:

Calculated for $C_{12}H_{28}O_4B_2$: Percent B=8.39%; mol. wt.=258. Found in product: Percent B=8.26%; mol. wt.=259.

IV

Example III was repeated except that potassium was used in place of sodium. The product recovered was comparable to that in Example III.

V

A solution of 81.37 grams (0.35 mole) of chlorodiphenoxyborane in 100 ml. of toluene was added at room temperature and in an inert atmosphere to 8.51 grams (0.37 mole) of sodium dispersed in 400 ml. of toluene. 5 ml. (0.049 mole) of tripropylamine was added and the mixture was stirred for 3 hours at from about 30° C. to 50° C. The solids were filtered off, and the solvent was removed from the filtrate by distillation at reduced pressure to give tetraphenoxydiboron as the residual product. Chemical analysis of this product yielded the following data:

Calculated for $C_{24}H_{20}O_4B_2$: Percent B=5.49%; mol. wt.=394. Found in product: Percent B=5.67%; mol. wt.=391.

Other modes of applying the principle of the invention may be employed provided the features stated in any of the following claims or the equivalent of such be employed.

We, therefore, particularly point out and distinctly claim as our invention:

1. The method of producing substantially pure compounds having boron-boron bonds which comprises the reaction, in an inert atmosphere with constant agitation, of a compound of the formula $(RO)_2BX$ with an alkali metal having a continuously clean available surface in the presence of an amine selected from the group consisting of pyridine and tertiary alkyl amines having primary and secondary alkyl groups of 1 to 6 carbon atoms, where $(RO)_2BX$ is selected from the group consisting of dialkoxymonohaloboranes and diaryloxymonohaloboranes wherein R is a radical selected from the group consisting of alkyl of from 1 to 20 carbon atoms, phenyl, naphthyl and alkyl substituted phenyl said alkyl substituents having from 1 to 12 carbon atoms and X is halogen.

2. The method of claim 1 where said alkali metal is sodium.

3. The method of producing tetraethoxydiboron which comprises the reaction in an inert atmosphere with constant agitation of chlorodiethoxyborane and dispersed sodium in the presence of triethylamine.

4. The method of producing tetraphenoxydiboron which comprises the reaction, in an inert atmosphere with constant agitation, of chlorodiphenoxyborane and dispersed sodium in the presence of tripropylamine.

References Cited in the file of this patent

UNITED STATES PATENTS 2,974,165     Brotherton et al. _____ Mar. 7, 1961